United States Patent [19]

Carter

[11] Patent Number: 4,538,696
[45] Date of Patent: Sep. 3, 1985

[54] COLLAPSIBLE ELECTRIC GOLF CART

[76] Inventor: Lee T. Carter, 3400 Portola Dr. #11, Santa Cruz, Calif. 95062

[21] Appl. No.: 518,619

[22] Filed: Jul. 29, 1983

[51] Int. Cl.[3] .............................................. B62D 51/04
[52] U.S. Cl. ................................. 180/19.3; 180/68.5; 180/210; 188/176; 280/641; 280/DIG. 5
[58] Field of Search ................... 180/65.1, 19.1, 19.3, 180/68.5, 208, 209, 210; 280/DIG. 6, DIG. 5, 651, 641, 758; 188/176, 177, 178

[56] References Cited

U.S. PATENT DOCUMENTS

| | | | |
|---|---|---|---|
| 2,132,069 | 10/1938 | Hall | 180/19.1 X |
| 2,480,597 | 8/1949 | Nelson | 280/DIG. 6 |
| 2,706,008 | 4/1955 | Voigt | 280/DIG. 5 |
| 2,962,106 | 11/1960 | Burnside et al. | 180/65.1 X |
| 3,041,085 | 6/1962 | White | 280/DIG. 5 |
| 3,094,185 | 4/1917 | Rocoosin | 180/19.3 |
| 3,199,621 | 8/1965 | Seaman | 180/68.5 |
| 3,719,247 | 3/1973 | Hollis | 180/19.3 |
| 3,815,699 | 6/1974 | Ganskopp et al. | 180/19.1 X |
| 4,289,324 | 9/1981 | Nemeth | 280/651 X |

FOREIGN PATENT DOCUMENTS 850125 9/1960 United Kingdom ......... 280/DIG. 6

*Primary Examiner*—David M. Mitchell
*Assistant Examiner*—Mark C. Dukes
*Attorney, Agent, or Firm*—Paul L. Hickman

[57] ABSTRACT

A battery powered golf club cart having an elongated handle which controls both the power applied to its rear wheels and a brake associated with its front wheel. When the handle is depressed an electric motor which rotates the rear wheels is actuated and the front brake is released. When the handle is raised, the electric motor is disabled and the front wheel is drawn into contact with a braking member. A full set of golf clubs are vertically held in a flat rack forming a part of the cart framework and, after removal of the battery, the cart may be collapsed into a thin flat package, convenient for transporting and storage, without need for removal of the golf clubs.

14 Claims, 12 Drawing Figures

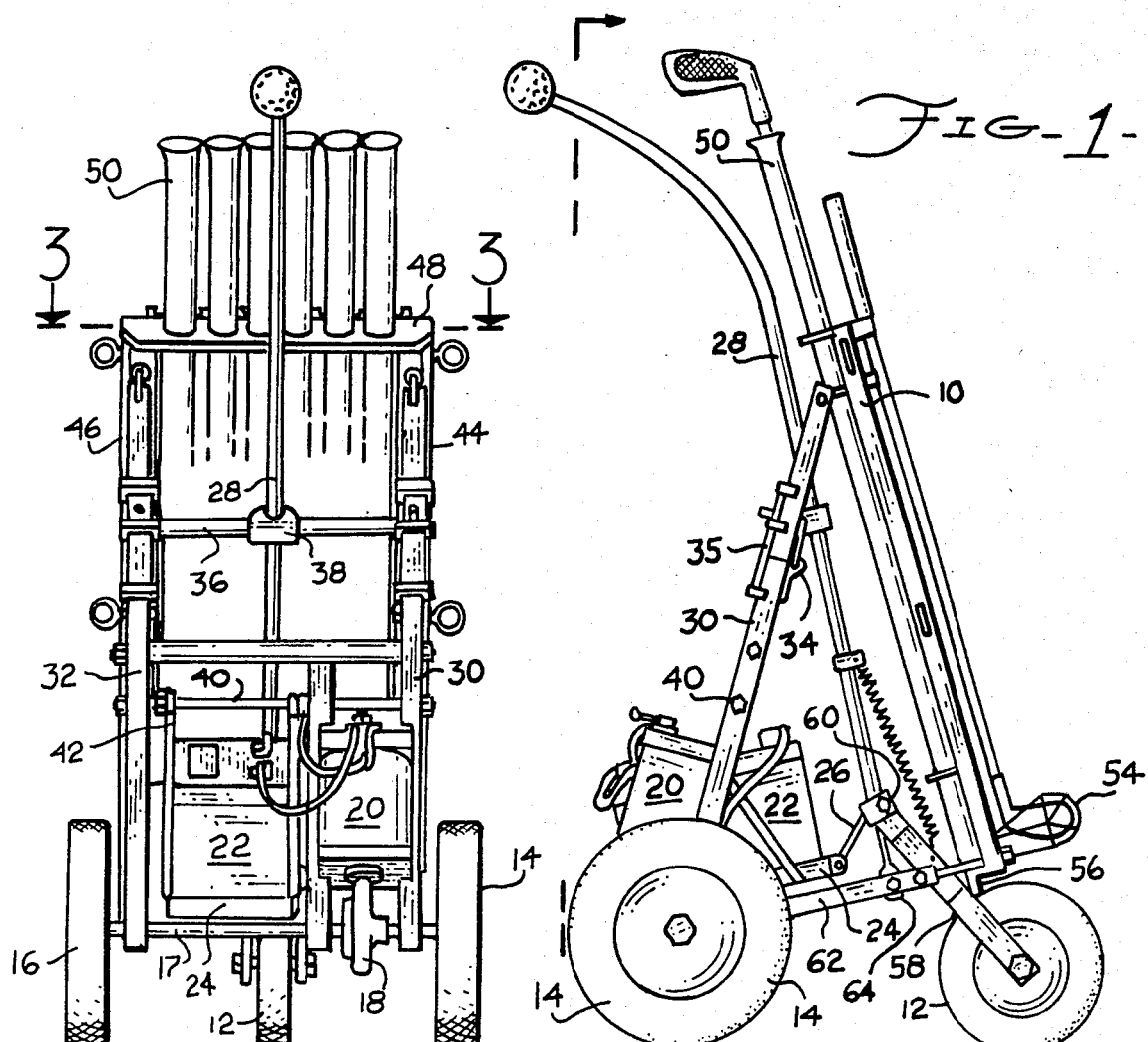
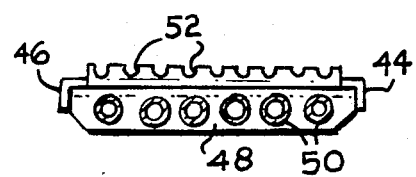
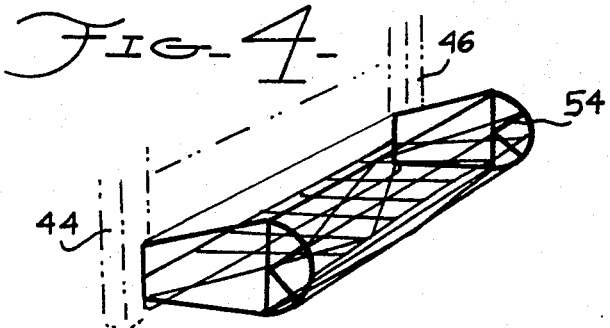

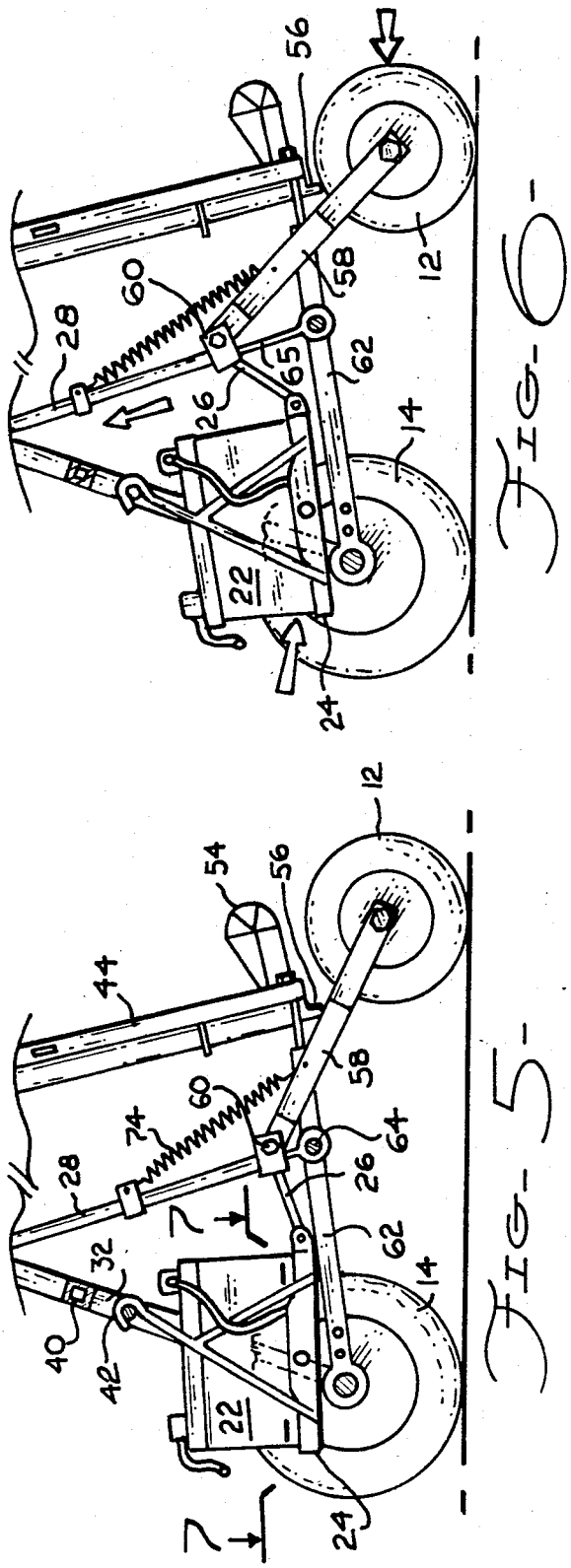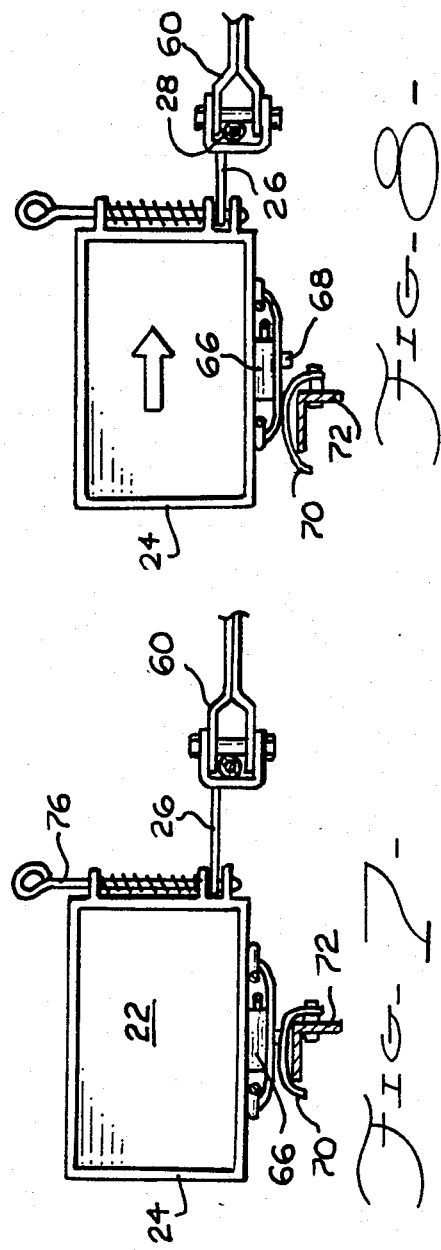

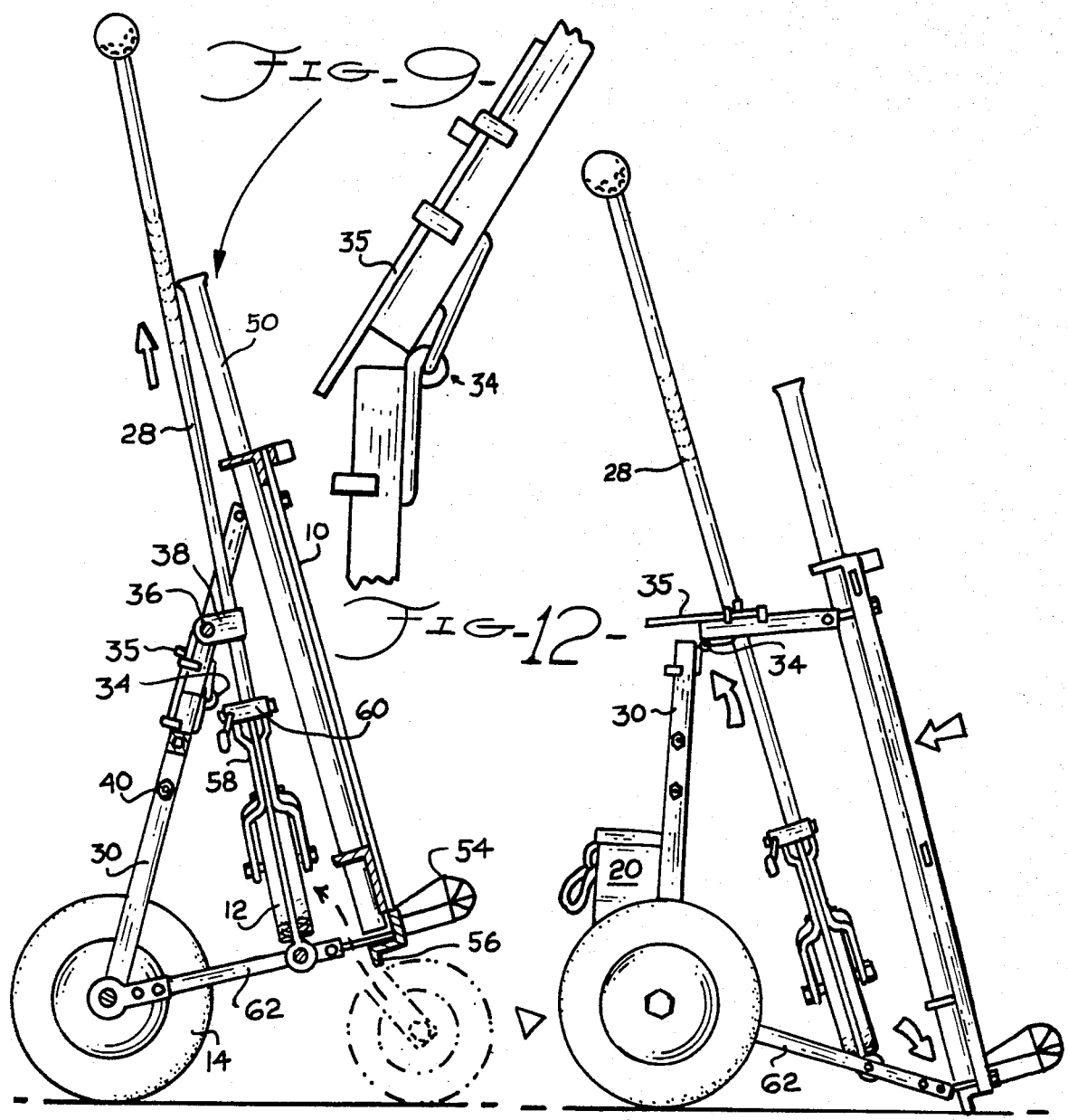
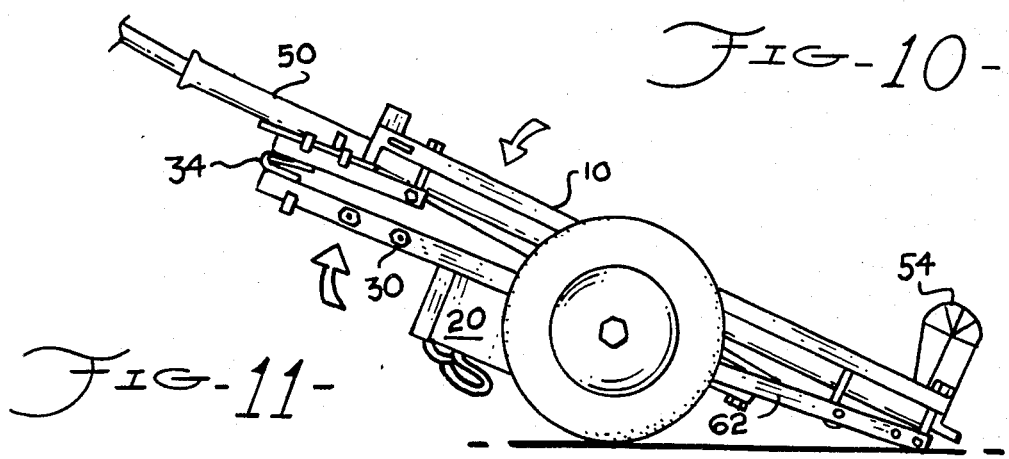

COLLAPSIBLE ELECTRIC GOLF CART

BACKGROUND OF THE INVENTION

1. Field of the Invention

This invention relates generally to electrically powered vehicles and more particularly to motorized golf carts.

2. Description of the Prior Art

Most golf enthusiasts enjoy the exercise of walking the golf course but some have difficulties in pulling a heavy golf cart, particularly up relatively steep hilly areas of the course. To address this problem, a number of powered golf carts have been devised.

Most powered golf carts include a wheeled frame adapted to carry a golf bag, an electric motor coupled to at least one of the wheels, a storage battery, and a control mechanism coupling the storage battery to the electric motor. They are sometimes provided with braking mechanisms. Electric golf carts of the prior art tend to be large, bulky, and heavy and thus are difficult to transport, particularly in passenger vehicles.

Some prior art electric golf carts are partially collapsible so as to be more readily transportable. For example, in U.S. Pat. No. 3, 719,247 of Hollis an electrically driven golf cart is disclosed which can be collapsed in a transverse manner. A similar collapsible golf cart is disclosed in U.S. Pat. No. 4,289,324 of Nemeth.

A problem with prior art collapsible electric golf carts is that they still are too large to fit within the trunk of a car without partial disassembly. Furthermore, most of the prior art golf carts of this type utilize standard golf bags which must be removed and stored separately for compactness. A more compact flat rack carrier such as the one described in U.S. Pat. No. 2,480,597, has not been applied to electric golf carts.

Another problem with prior art electric golf carts is that they are difficult to operate. Many have separate switches and levers to control such functions as steering, braking, and acceleration.

SUMMARY OF THE INVENTION

An object of this invention is to provide a collapsible, electric golf cart that can easily fit into the trunk of a car.

Another object of this invention is to provide an electric golf cart that is simple to operate.

Yet another object of this invention is to provide a golf cart with a removable golf club rack.

A still further object of this invention is to provide an electric golf cart that is simple to design, yet rugged and functional in use.

Briefly described, the golf cart includes a tricycle having the two rear wheels driven through a drive gear assembly by a D.C. motor. The storage battery for the motor is mounted on a frame that is suspended from the cart frame and is also pivotally connected to the golfer's vertical control handle so that raising the handle will pivot the battery to both move the center of gravity forward and also to open an electrical switch between the battery and the motor. The single forward wheel of the tricycle is pivotally connected to the vertical control handle so that the raising of the handle will draw the forward wheel back against a braking member.

The golf cart can easily climb any reasonably steep golf course hill. After removal of the storage battery, the cart is readily collapsible for convenient and compact storage and for transporting in an automobile trunk. The cart may be adapted to carry a conventional golf bag of clubs but includes a flat club carrier rack which separates the clubs to prevent unnecessary wear of the club grips and minimizes scratching or nicking of the club heads. The flat club rack remains in position with clubs intact when the cart is collapsed for transporting or storage or, after removal of four screws, the club rack may be removed for flat storage. With minor adaptations, the club rack can be converted into a back pack.

To collapse the cart for transporting and storage, the battery is first removed thereby permitting the forward wheel to be drawn further rearward, rotated a quarter turn with the vertical handle, and raised up into the framework of the cart immediately behind and in a plane nearly parallel with the flat club storage rack. The upper portion of the frame is then pivoted over and downward to provide a very convenient flat package containing the golf clubs.

An advantage of this invention is that it may be collapsed very compactly, in contrast to prior art electric golf carts. This feature of collapsibility allows the golf cart of the present invention to be easily stored within the trunk of most passenger cars.

Another advantage of this invention is that the golf club rack is removable to allow the golf clubs to be carried separately from the golf cart.

A still further advantage of this invention is that the golf cart is easily operated and steered with a single control handle.

These and other objects and advantages of the present invention will no doubt become apparent upon a reading of the following descriptions and a study of the several figures of the drawing.

BRIEF DESCRIPTION OF THE DRAWING

FIG. 1 is a side elevation view of an electric golf cart in accordance with the present invention.

FIG. 2 is a rear elevation view thereof taken along line 1—1 of FIG. 1.

FIG. 3 is a plan view of the removable club carrier rack.

FIG. 4 is a perspective view of the club supporting basket at the lower end of the club carrier rack.

FIG. 5 is a sectional elevation view illustrating the golf cart in its running mode.

FIG. 6 is a sectional elevation view similar to that of FIG. 5 but illustrating the cart in its braked mode.

FIG. 7 is a plan view taken along the lines 7—7 of FIG. 5.

FIG. 8 is a plan view of the battery position in the braked mode of FIG. 6 illustrating the opened batter switch.

FIGS. 9 and 10 are elevation views illustrating the steps in collapsing the golf cart.

FIG. 11 is an elevation view of the cart, collapsed and ready for transporting and/or storage.

FIG. 12 is a detail view of the leg hinge assembly.

DETAILED DESCRIPTION OF THE PREFERRED EMBODIMENT(S)

FIG. 1 is a side elevation view of the golf cart and illustrates a flat golf club carrier rack 10 mounted to the front of the cart. The rack 10 is supported on a tricycle including a forward wheel 12, and a pair of spaced rear wheels 14 and 16. The rear wheels are supported on an rear axle 17 which can be rotated by a drive gear assembly 18 (see FIG. 2). The drive gear assembly 18 is actuated by the shaft of a D.C. motor 20 connected to a small storage battery 22 that is mounted on frame 24. As will be discussed in greater detail subsequently, frame 24 has its forward end coupled by a short link 26 to a vertical tubular control handle 28.

When assembled for use, the framework of the golf cart comprises an identical pair of substantially right triangular frames with each leg of each pair being pivotable at its junction with adjacent legs. The rear legs 30 and 32 are pivotally connected to the rear axle 17 at their lower ends and to the side of the flat club storage rack 10 at their upper ends. Legs 30 and 32 can be pivoted at hinges 34 for collapsing the cart. The hinges 34 are located at points approximately ⅔ of the way up the length of legs 30 and 32. A pair of slide-bolts 35 prevent the legs 30 and 32 from pivoting on hinges 34 during use.

Suitable cross members interconnect the legs 30 and 32 including a cross member 36 that is located above the hinge 34 and which provides support for the tubular handle 28 through a slidable tee fixture 38 that pivots on the cross member 36. Another cross member 40 between the legs 30 and 32 is positioned at a point slightly less than half the length of the legs from the rear axle 17 and provides a means for supporting a pivotable hooked hanger 42, the lower end of which supports the rear end sides of the battery frame 24.

As previously mentioned, the golf club carrier rack 10 is preferably flat having two vertical side frame members 44 and 46 that are attached together at an upper end by a member 48. The member 48 contains holes for the mounting of conventional golf club tubes 50, and also contains a plurality of semicircular notches 52. The golf club tubes 50 are used to carry woods, and the semicicular notches 52 are used to support the handles of irons. Referring additionally to FIG. 4, the vertical side members 44 and 46 at the lower end of the rack 10 are connected by a horizontal basket 54 partitioned to support and separate the heads of the irons. An angle cross member 56 also interconnects the lower ends of side frame members 44 and 46 and, as will be described in connection with FIGS. 5 and 6, serves both as a braking member acting against the periphery of the rubber tire wheel 12 and also as a support against which the frame or fork 58 of the wheel 12 normally rests in the running mode.

The wheel fork 58 supports the axle of front wheel 12 at one end, and is pivotally connected at its other end to a connecting fixture 60 attached to the lower end of the vertical control shaft 28. An end of the short link 26 is also attached to connecting fixture 60.

The base or lower frame members 62 of the golf cart pivotally interconnects the lower ends of the club rack frame members 44 and 46 with the rear axle 17. The base members 62 may be adjustable in length for varying the base length of the cart and has at least one interconnecting cross member 64 which supports in its center a pivotally connected shaft 65 which extends vertically into the bore of the tubular control handle 28 to provide lower end stability and to assure continued alignment of the handle when it is raised or lowered.

FIGS. 5 and 6 are sectional elevation views illustrating the operation of the electrical golf cart in its running and braking modes, respectively. In FIG. 5 the tubular control handle 28 is in its lowered position so that the connecting fixture 60 has forced outward the short link 26, the battery frame 24 and battery 22. It has also forced forward the wheel fork 58 and wheel 12 so that the fork rests against the bottom of the angle cross member 56.

In FIG. 6 the handle 26 has been lifted in the direction shown by the arrow so that the link 26 and battery 22 swing inwardly on the hooked hanger 42 while the forward wheel 12 is similarly drawn rearwardly so that its periphery bears against the brake provided by the angle cross member 56. The instability that may result from the movement of wheel and resulting shorter wheelbase is more than counteracted by the shifting inward of the battery and resulting center of gravity change.

FIGS. 7 and 8 illustrate the electrical switching resulting from the position shifting of the battery 22 discussed above. Attached to one inner side surface of the battery frame 24 is an electrical switch 66 such as a microswitch type that is normally open and closed by depressing a spring biased button or pin 68 extending from the outer surface. The switch 66 couples the underground terminal of the battery 22 to the motor 20 and thus controls the excitation of the motor. A power controller such as rheostat 69 (see FIG. 1) may optionally be provided in series with switch 66 to adjust the level of power available to motor 20. A resilient strip 70 connected to a stationary member 72 (such as part of the motor mounting) is positioned to depress the switch pin 68 when the motor is in its rearmost position or running mode as shown in FIG. 7.

When the tubular control handle 28 is lifted as shown in FIG. 6 the battery 22, frame 24, and switch 66 slides to the right as shown by the arrow of FIG. 8 and the spring biased switch pin 68 is released to open the switch and remove power from the motor. It will be appreciated that the weight of the battery in the OFF mode of FIGS. 6 and 8 will prevent accidental starting of the cart. To prevent any accidental shut-off that may be caused by the battery shifting during the ON mode and due to the vibrations of rough terrain, the shaft of the control handle may be biased downward by a spring 74 as illustrated in FIGS. 5 and 6.

FIGS. 9 and 10 illustrate the steps involved in collapsing the golf cart for transporting and/or storage. The battery 22 is first removed by releasing the hooked shaft 42 of FIGS. 5 and 6 from the cross member 40 and the spring biased release pin 76 is withdrawn to disconnect the battery frame from the link 26. The battery is then readily lifted from the cart.

After removal of the battery and its frame, the golf cart is tilted backward so that the wheel 12 may be withdrawn under the brake member 56 as the handle is lifted to its full extent and rotated a quarter turn to place the wheel within the framework of the cart and in a plane substantially parallel with the plane of the club carrier rack 10 as shown in FIG. 9. The hinges 34 in the rear legs 30 and 32 are then released by lifting slide bolts 35 so that the upper portion of the rear legs will fold forward as shown in FIG. 10. When hinges 34 are completely folded back, the golf cart is fully collapsed as shown in FIG. 11 and is now a convenient size and shape for wheeling away and for storage without the need for removal of the golf clubs from the carrier rack.

The carrier rack 10, with the golf clubs, can be removed from the rest of the cart, if desired. An optional backpack adaptor (not shown) can be used with the carrier rack.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. An electrically powered golf cart comprising:
   a tricycle including
   a single forward wheel, and first and second rear wheels,
   axle means supporting said rear wheels,
   a drive gear assembly for rotating said axle means;
   a controllable electric motor for providing rotational power to said drive gear assembly;
   a rack for supporting a plurality of golf clubs in vertical parallel spaced relation substantially over said foward wheel;
   means for collapsing the golf cart into a flat, compact unit without removal of the golf clubs from said rack;
   a pair of triangular frames forming the framework of said cart, each of said pair of frames being pivotally coupled to said axle means and to the top and bottom sides of said rack, said rack forming one leg of the triangular frame for each of said pair of frames;
   a control handle movable substantially vertically within said framework for controlling the excitation of said motor and the braking of said forward wheel; and
   a frame for mounting a storage battery, said frame being supported by hooks removably attached to members of said framework and further supported by a linkage pivotally connected to said movable control handle, whereby the raising of said handle moves said frame toward the center of said framework.

2. The golf cart as recited in claim 1 further comprising an electrical switch coupling said battery to said electric motor, said electrical switch being positioned in the path of said battery frame such that it is opened and closed, respectively, by the movement of said battery frame toward the center of said cart framework and away from the center of said cart framework.

3. The golf cart as recited in claim 1 wherein the single forward wheel of said tricycle is rotatable on an axle supported at the first end of a fork, the second end of said fork being pivotally connected to said movable control handle, a point on the top of said fork between said first and second ends lying against the lower surface of a cross member across the bottom of said rack, said cross member contacting the periphery of said forward wheel to operate as a brake upon the raising of said movable handle.

4. The golf cart as recited in claim 3 wherein the frame members of the triangular framework pairs coupled between the rear wheel axles and the top sides of said club rack are hinged on the inner surfaces of the frame members whereby, upon removal of said battery frame and the withdrawing of said forward wheel into the center of said framework behind and parallel with said club rack, the hinged and pivoted legs of said framework pairs may be collapsed.

5. A golf cart comprising:
   a collapsible frame assembly including a separated pair of triangular framework members coupled together at a lower, rearward apexes thereof by a rear axle, said frame assembly including a braking surface;
   a pair of rear wheels coupled to said rear axle;
   an elongated control handle attached to said frame assembly;
   a front wheel attached to a lower end of said control handle, said front wheel being located proximate lower, forward apexes of said pair of triangular frameworks when in an operating position, and being locatable within said frame assembly when said collapsible frame assembly is in a collapsed position; said front wheel being coupled to said control handle by a pivoting link, whereby said front wheel can be drawn against said braking surface by the vertical movement of said control handle; and
   carrying means attached to said frame assembly adapted to carry a set of golf clubs.

6. A golf cart as recited in claim 5 further comprising:
   an electric motor coupled to said rear axle;
   a battery support attached to said collapsible frame;
   a storage battery supported by said battery support; and
   means for selectively coupling said storage battery to said electric motor.

7. A golf cart as recited in claim 6 wherein said means for selectively coupling said storage battery to said electric motor includes switch means responsive to the vertical position of said control handle.

8. A golf cart as recited in claim 7 wherein said battery support is pivotally supported by said collapsible frame assembly and is connected to said control handle by a pivoting link, and wherein said switch means is controlled by the pivotal motion of said battery support.

9. A golf cart as recited in claim 8 wherein said means for selectively coupling said storage battery to said electric motor includes power adjustment means for varying the power supplied to said electric motor.

10. A golf cart comprising:
    a collapsible frame assembly supported by a plurality of wheels;
    braking means for braking at least one of said wheels;
    an electric motor for rotating at least one of said wheels;
    a storage battery;
    coupling means for coupling said battery to said electric motor;
    club carrying means attached to said frame assembly; and
    a control handle coupled to said frame assembly and operative to control said braking means, said braking means including a linkage coupling a wheel to said control handle such that a movement of said control handle draws said wheel against a surface of said frame assembly.

11. A golf cart as recited in claim 10 wherein said coupling means includes a switch coupling said battery to said electric motor, said switch being responsive to the position of said control handle.

12. A golf cart as recited in claim 11 further comprising a pivoting support for said battery coupled to said frame assembly, and a pivoting link attaching said support to said control handle, and wherein said switch is responsive to the pivotal position of said support.

13. An electrically powered golf cart comprising:
    a pair of triangular frame members each having a base leg, a rear folding leg, and a front support leg;

an axle coupling said pair of frame members together proximate a juncture of said rear folding legs and said base legs;

a pair of rear wheels attached to opposing ends of said axle;

a sliding control handle assembly including a first member slidingly supported by collar means between said rear folding legs of said pair of triangular frame members, and a second member slidingly engaged with said first member and pivotally supported by a pivotal support means between said base legs of said triangular frame member; and a front wheel operationally disposed approximately one half the way between junctures of said front support legs and said base legs of said triangular frame members, means coupling said front wheel to said control handle, whereby said front wheel can be drawn within said front support legs, said rear folding legs, and said base legs by sliding said first member of said control handle in an upward direction.

14. An electrically powered golf cart as recited in claim 13 wherein said first member and said second member of said control handle are telescopically engaged.

* * * * *